June 17, 1958
J. W. LOVELY
2,838,887
COMPENSATING RADIAL WORK SUPPORT FOR
AN INTERNAL CENTERLESS GRINDER
Filed July 2, 1957
2 Sheets-Sheet 1
*Fig. 1.*
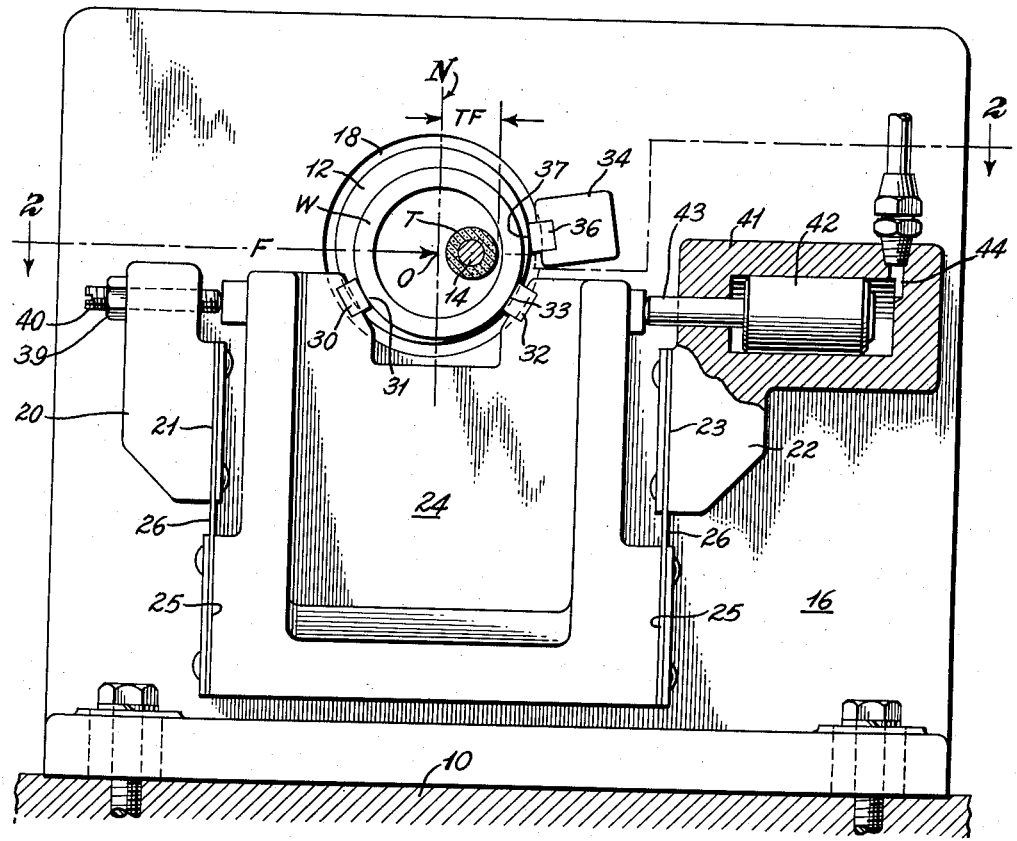
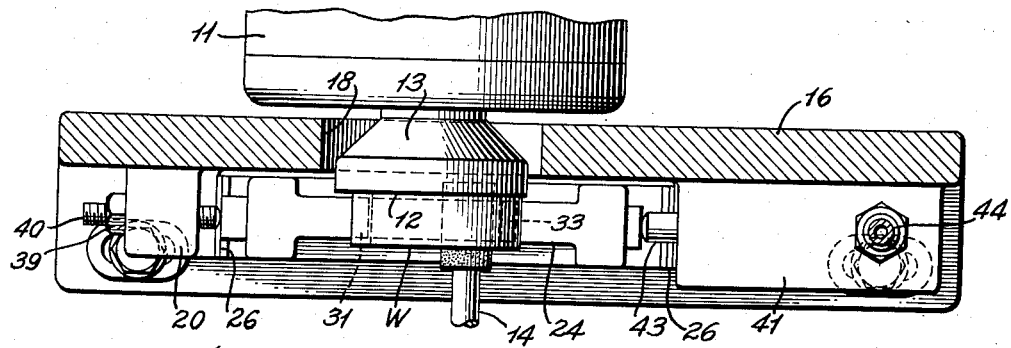
*Fig. 2.*
INVENTOR
John W. Lovely
BY
Sughrue & Rothwell
ATTORNEYS

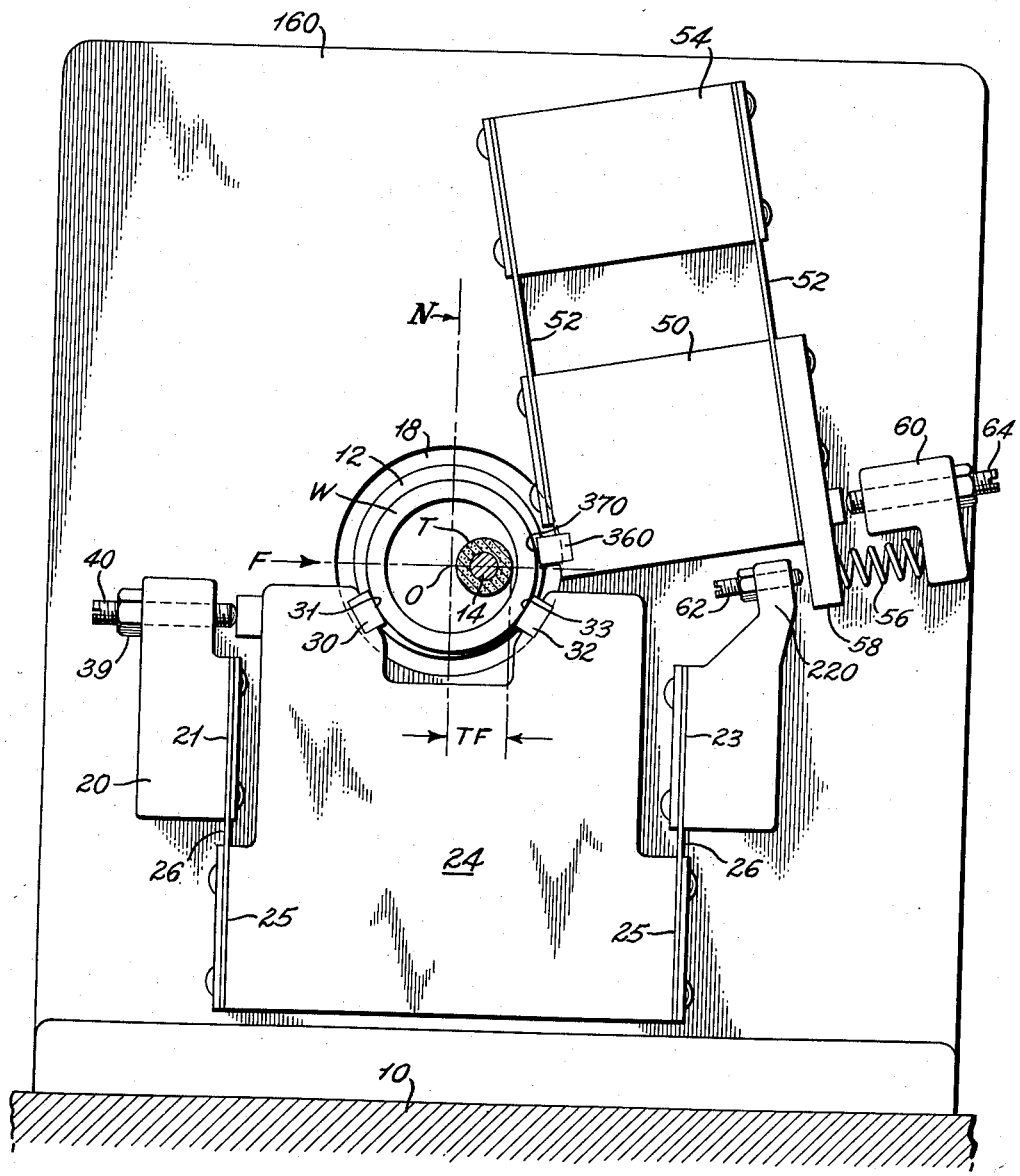

United States Patent Office 2,838,887
Patented June 17, 1958

2,838,887
COMPENSATING RADIAL WORK SUPPORT FOR AN INTERNAL CENTERLESS GRINDER

John W. Lovely, Springfield, Vt., assignor to Bryant Chucking Grinder Company, Springfield, Vt., a corporation of Vermont Application July 2, 1957, Serial No. 669,554
6 Claims. (Cl. 51—103)

This invention relates to improvements in internal centerless grinding machines of the type wherein an annular workpiece is radially supported on a preformed outside periphery for rotation in frictional relationship to supporting shoes peripherally spaced along the surface and a tool is applied to its inner periphery to generate an internal surface concentric with the preformed outer surface. An example of this type of grinding machine is disclosed in the U. S. patent to Arms et al. 2,635,395. More particularly, this invention relates to an improved compensating radial work support for internal centerless grinding machines such as described above.

In internal centerless grinding, typical annular workpieces, such as raceway rings for antifriction bearings, must be produced at a fast rate while holding narrow tolerance limits in concentricity and diametrical dimensions. Because of prevailing economic and technological reasons, the preformed outside surfaces of successive workpieces are allowed to have dimensional variations between successive workpieces and the machine is expected to accept such workpieces at random and constantly therein produce a hole of predetermined diameter regardless of diametrical variations in the supported outside periphery. Although this condition of added complication could be wholly, or at least partially, remedied by pregaging and classification grouping of workpieces, any such means have heretofore proven uneconomical. From the foregoing, it follows that in order to accomplish the above stated desirable results the centers of the workpieces, at least during the final phase of the grinding process, must always be located at a predefined position irrespective of diametrical differences between the outside diameters of successive workpieces. Hence, when the feed movement is constant from a line through the centers of the successive workpieces and normal thereto, the inside diameter of the holes generated will be constant.

It is, therefore, an object of this invention to provide means for randomly accepting successive workpieces with differences in outside diameters and to support these workpieces for internal centerless grinding with the centers of the workpieces in predetermined positions.

Another object of this invention is to provide a radial work support that automatically compensates for random differences in outside diameters between successive workpieces.

A further object of this invention is to provide a device wherein the radial support means are arranged in a manner so that at least during the final part of the grinding operation, the center of the workpiece is located at a controlled predetermined position relative to the final contact point between the workpiece and the tool.

In general, these objects are accomplished by radially supporting the outside periphery of the workpieces at two points angularly spaced about an intersecting line normal to the line of feed. These supporting points are contained in a member movable in translation parallel to the line of feed. Means are provided to limit this movement in one direction to positively locate the intersecting line of a predetermined distance from the plane tangent of the leading edge of the tool. To support the workpieces during the rough grinding phase when the tool exerts a relatively heavier pressure, a further radial work support is provided in the proximity of the line of feed to unyieldingly limit thhe movement of the member in the other direction. This third support may either be stationary, or movable and resiliently biased against the wall of the workpiece.

For a more complete understanding of this invention reference may be had to the following detailed description, taken in connection with the accompanying drawings, wherein:

Figure 1 is a side elevation, with a portion in section, illustrating a preferred embodiment of the compensating radial work support of this invention;

Figure 2 is a plan view, with a portion in section, taken along line 2—2 of Figure 1;

Figure 3 is a side elevation illustrating a modification of the invention.

Referring to Figures 1 and 2, a surface 10 of a grinding machine bed supports a headstock housing 11 containing a rotatable spindle 13 with a work-driving face 12 portion thereof normal to the rotational axis for axially supporting an annular workpiece W held in frictional relationship thereto. This work driver compels the workpiece to rotate and, at the same time, seats the workpiece against the radial supports, as described in the Arms et al. patent, 2,635,395, referred to above. A rotatable spindle 14 carrying a tool T is positioned within the annular workpiece, and the headstock-supported workpiece and tool T are arranged for relative feed movement in the direction of the arrow on line F. A bracket 16 is secured to the surface 10 and has a portion upstanding therefrom. This portion contains a hole 18 which provides access for the work-driving spindle, as shown in Figure 2.

A pair of lugs 20 and 22 are attached to the bracket 16 and have plane surfaces 21 and 23 facing each other. These surfaces are parallel to each other and normal to a plane defined by line F and the axis of spindle 14. A cradle member 24 having surfaces 25—25 parallel to each other and to surfaces 21 and 23 is suspended by flexible reeds 26—26 attached to surfaces 21—25 and 23—25. This reed suspension permits the cradle a movement parallel to line F only. Fixedly nested in the cradle 24 are shose 30 and 32, which are angularly spaced from an intersecting line N normal to line F. Face portions 31 and 33 of the shoes 30 and 32 function as radial supports for the outer periphery of the workpiece W locating the center thereof on the line N.

To solidly support the workpiece against the heavier forces exerted by the tool during the rough grinding phase, a third radial work support is provided in proximity of the line of feed and in the path of the tool. This support comprises a shoe 36, fixedly nested in a lug 34, which is attached to bracket 16. The shoe 36 has a face portion 37 which is spaced a distance from the intersection O between the lines F and N such that it is outside and adjacent the periphery of a circle defined by the maximum permissible diameter workpiece supported on shoes 30 and 32 when the line N is located at an adjusted predetermined position from the plane tangent to the leading edge of the tool, as will be explained below.

An adjustable stop is provided for the movable cradle 24 by a screw 40 which is threaded through the lug 20. A nut 39 may be used to lock the screw 40 in adjusted position. A fluid motor 41 is provided for forcing the cradle member 24 against the adjustable stop 40. This motor comprises a cylinder containing a piston 42 with a piston extension 43. Fluid pressure may be introduced to the motor through conduit 44.

The device is preferably adjusted in the following manner: With fluid pressure admitted through conduit 44 behind piston 42, the adjustable stop 40 is adjusted to abut the cradle 24 and move the cradle until the leading edge of the tool T is a predetermined distance TF from the line N. This distance equals the desired amount of radius of a hole to be generated in a workpiece minus the amount of feed motion in the direction of the arrow along the line of feed F. After this adjustment, the fluid pressure is relieved from behind the working face of piston 42 and the device is ready for operation. In operation, a workpiece is seated on faces 31 and 33 of shoes 30 and 32 with an endface thereof held against work-driver face 12 and compelled to rotate in the manner described in the Arms et al. Patent 2,635,395. The infeed between the tool and the work is started and the force from the tool contact will move the cradle 24 parallel to the line of feed F until the periphery of the workpiece contacts face 37 of fixed shoe 36. After a predetermined amount of stock has been removed from the workpiece, the tool may be retracted, and the fluid pressure is then introduced through conduit 44, thereby forcing the cradle 24 against the adjustable stop screw 40. The feed is again started, normally at a slower rate than during the first period, and is subsequently stopped when the leading edge of the tool has traversed to the limit of the desired radius of the hole to be generated. By executing this final phase of grinding operation with a positive relationship between the normal line N and the leading edge of the tool, it will be evident that a fixed amount of infeed will consistently generate a hole of a predetermined size irrespective of differences between the outside diameter of the successive workpieces.

Figure 3 illustrates a modification and a variation applying the principles of this invention. In this modification, the third support is constantly in contact with the surface of the workpiece. Attached to the surface 10 of the grinding machine bed is a headstock housing and a bracket 160. The mounting of the cradle 24 is the same as in the Figure 1 arrangement with a like relationship between shoes 30 and 32, the workpiece and work driver, the tool T, the line F, and the intersector or normal line N. Furthermore, the adjustable stop screw has the same function as before; namely, to establish the distance TF. The flexible reeds 26 are arranged to constantly bias the cradle 24 against the stop screw 40.

The third support is a shoe 360 having a face portion 370 which supports the workpiece in the proximity of the line of feed with a wall of the workpiece interposed between the face 370 and the tool T. This shoe is carried by a movable block 50 which is supported by means of flexible reeds 52—52 attached to a lug 54 secured to the bracket 160. A compression spring 56 is interposed between a tongue 58 projecting from block 50 and another lug 60 depending from the bracket 160. This spring functions to bias the shoe 360 of the reed-suspended assembly in the direction of the point O at the intersection of lines N and F. An adjustable stop 62 carried by a lug 220 limits the inward movement caused by the spring bias, and the movement in the opposite direction is limited by an adjustable stop 64 threaded in a lug 60.

The cradle position is initially adjusted as described above to place the line N a predetermined distance TF from the leading edge of tool T when the cradle abuts stop 40. Adjustable stop 64 is adjusted so that when block 50 is abutting it, the face 370 of shoe 360 will take a position such that the largest permissible diameter workpiece supported in shoes 30 and 32 would just contact face 370. The stop screw 62 is adjusted to prevent the face 370 from approaching any closer to the intersection O than a minute amount less than the radial distance defined by the radius of the smallest permissible workpiece. In operation, the grinding may be one continuous operation. During the first part of the grinding there may be a rapid infeed, forcing block 50 to the right toward stop 64. During the final portion of the grinding, when the grinding force along the line of feed is less than the spring forces of reeds 26 and spring 56, the cradle 24 is biased against the stop 40, thereby accurately positioning the center of the workpiece and allowing the tool to consistently generate an accurate inner diameter hole in annular workpieces having different outside diameters. Thus, it can be seen that the principal difference between this modification and the embodiment of Figure 1 is that all three radial support shoes are always in contact with the workpiece.

Applicant has disclosed two illustrated embodiments of an improved compensating radial work support for an internal centerless grinding machine. These illustrations are for the purpose of teaching one skilled in the art how to practice the invention and are not limiting, as the invention is limited only by the scope of the appended claims, wherein applicant is entitled to the full range of equivalents.

What is claimed is:

1. In an internal grinding machine having a base supporting a rotatable tool spindle, a tool adapted to be placed in working relationship with an internal surface of an annular workpiece, a bed on the base supporting a head stock containing a rotatable work driver spindle provided with a face portion normal to the spindle axis for axially supporting an end face of the workpiece in frictional relationship thereto, the supports for the tool spindle and the work driver spindle being arranged for relative transverse movement along a line of feed running through the axis of the tool driver spindle, and improved means on the bed for radially supporting the perimeter of the workpiece for rotation about a support determined axis, said improved means comprising: a support cradle supported by resilient means on the bed, said means permitting a limited movement of the cradle parallel to the line of feed, a pair of support shoes on the cradle angularly straddling a bisector normal to the line of feed, these shoes radially spaced and positioned to place said support determined axis in the proximity of the line of feed; a third shoe supported by the bed in proximity of the line of feed such that a wall of the workpiece may be interposed between this shoe and the tool; and biasing means for displacing the cradle in a direction away from the position of the third shoe.

2. A device as defined in claim 1 wherein said resilient support means for said cradle are flexible reeds.

3. A device as defined in claim 1 further comprising an adjustable fixed stop positioned to limit the movement of said cradle in a direction away from said third support shoe.

4. A device as defined in claim 1 where said biasing means are fluid motor means acting on the cradle to place the support determined axis in a first predetermined position on a line parallel to the line of feed.

5. A device as defined in claim 1 wherein said third shoe is rigidly fixed to said bed.

6. A device as defined in claim 1 wherein said third shoe is resiliently supported for movement toward and away from the grinding tool and adjustable stops for determining the limits of this movement.

References Cited in the file of this patent

UNITED STATES PATENTS

| 2,478,607 | Theler et al. | Aug. 9, 1949 |
| 2,680,939 | Humes | June 15, 1954 |
| 2,758,427 | Quimby | Aug. 14, 1956 |
| 2,784,534 | Townsend | Mar. 12, 1957 |